US008332560B2

(12) United States Patent
Marks et al.

(10) Patent No.: US 8,332,560 B2
(45) Date of Patent: Dec. 11, 2012

(54) SYSTEM AND METHOD FOR IDENTIFYING INOPERABLE CONNECTION POINTS IN A STORAGE ENCLOSURE

(75) Inventors: Kevin T. Marks, Round Rock, TX (US); Don H. Walker, Katy, TX (US)

(73) Assignee: Dell Products L.P., Round Rock, TX (US)

( * ) Notice: Subject to any disclaimer, the term of this patent is extended or adjusted under 35 U.S.C. 154(b) by 1615 days.

(21) Appl. No.: 11/178,552

(22) Filed: Jul. 11, 2005

(65) Prior Publication Data
US 2007/0011373 A1    Jan. 11, 2007

(51) Int. Cl.
*H05K 7/10* (2006.01)
(52) U.S. Cl. ........................ 710/301; 710/302
(58) Field of Classification Search ........... 710/301–302
See application file for complete search history.

(56) References Cited

U.S. PATENT DOCUMENTS

| | | | | |
|---|---|---|---|---|
| 5,504,905 A * | 4/1996 | Cleary et al. | ................. | 713/100 |
| 5,631,912 A * | 5/1997 | Mote, Jr. | ....................... | 714/727 |
| 5,895,493 A * | 4/1999 | Gatica | .......................... | 711/147 |
| 5,980,078 A * | 11/1999 | Krivoshein et al. | ............... | 700/1 |
| 6,438,625 B1 * | 8/2002 | Olson | .............................. | 710/9 |
| 6,473,706 B1 * | 10/2002 | Gallo et al. | .................... | 702/105 |
| 6,587,909 B1 * | 7/2003 | Olarig et al. | ................... | 710/302 |
| 6,639,914 B1 * | 10/2003 | Choi et al. | .................... | 370/389 |
| 7,401,171 B2 * | 7/2008 | Slutz et al. | .................... | 710/104 |
| 2001/0011348 A1 * | 8/2001 | Blumenau et al. | ............ | 713/100 |
| 2001/0049738 A1 * | 12/2001 | Doi | .............................. | 709/228 |
| 2003/0149753 A1 * | 8/2003 | Lamb | ........................... | 709/223 |
| 2006/0064542 A1 * | 3/2006 | Goodman et al. | ............ | 711/114 |
| 2006/0161714 A1 * | 7/2006 | Sue | .............................. | 710/309 |
| 2006/0230125 A1 * | 10/2006 | Johnson | ....................... | 709/220 |

* cited by examiner

*Primary Examiner* — Glenn A Auve
*Assistant Examiner* — Nimesh G Patel
(74) *Attorney, Agent, or Firm* — Baker Botts L.L.P.

(57) ABSTRACT

A system and method is disclosed for encoding a set of configuration data for a given expander and at some later point comparing the configuration data to a discovered configuration derived from an attempt to discover the operability of each phy or connection point of the storage system. The configuration identifies the phys or connection points that are operable and the mapping of operable connection points to wide ports communicatively of an expander.

15 Claims, 4 Drawing Sheets

| BYTE\BIT | 7 | 6 | 5 | 4 | 3 | 2 | 1 | 0 |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 7 | | | | | | | | |
| 8 | | | | | | | | |
| 9 | | | | | | | | |
| 10 | | | | | | | | |
| 11 | | | | | | | | |
| 12 | (MSB) | | | | | | | |
| 19 | | | VENDOR IDENTIFICATION | | | | | (LSB) |
| 20 | (MSB) | | | | | | | |
| 35 | | | PRODUCT IDENTIFICATION | | | | | (LSB) |
| 36 | (MSB) | | | | | | | |
| 39 | | | PRODUCT REVISION LEVEL | | | | | (LSB) |
| 40 | | | WIDE PORT COUNT=4 | | | | | |
| 41 | (MSB) | | | | | | | |
| 42 | | | WP 1= F000h | | | | | (LSB) |
| 43 | (MSB) | | | | | | | |
| 44 | | | WP 2= 0C00h | | | | | (LSB) |
| 45 | (MSB) | | | | | | | |
| 46 | | | WP 3= 0300h | | | | | (LSB) |
| 47 | (MSB) | | | | | | | |
| 48 | | | WP 4= 00F0h | | | | | (LSB) |

FIG.3

SYSTEM AND METHOD FOR IDENTIFYING INOPERABLE CONNECTION POINTS IN A STORAGE ENCLOSURE

TECHNICAL FIELD

The present disclosure relates generally to the field of computer networks, and, more generally, to a system and method for identifying inoperable connection points in a storage enclosure.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems may be included as elements of a storage network. A storage network can be considered as a specialized network of storage devices coupled to one or more data servers. A storage enclosure is an element of a storage network. A storage enclosure is a self-contained physical enclosure that includes within the enclosure a number of storage elements or storage drives. Storage drives typically comprise disk-based storage drives. Serial Attached SCSI (SAS) is a storage network interface and communications protocol for storage transactions. SAS storage networks are characterized as having a serial, point-to-point architecture and improved data integrity, as compared with parallel SCSI storage networks.

SAS storage networks may include a topology within a storage enclosure that includes wide port links coupled to one or more expanders. If a failure in a wide port link occurs, it may be difficult to recognize the failure of the wide port link during the discovery process that occurs at the initialization of the storage enclosure. The failure of a wide port link, whether recognized or unrecognized, limits the bandwidth available on the wide link. In addition, when a wide port link is expected to be operable and is not operable, a mismatch may exist in the mapping of drives in the storage enclosure to hosts or server slots.

SUMMARY

In accordance with the present disclosure, a system and method is disclosed for encoding a set of configuration data for a given expander and at some later point comparing the configuration data to a discovered configuration derived from an attempt to discover each phy or connection point of the storage system. The configuration data identifies the phys or connection points that are intended to be operable and the mapping of operable connection points to wide ports of an expander.

The system and method disclosed herein is technically advantageous because it provides a system for verifying the discovered configuration of a storage system. Without a means for verifying the discovered configuration of a storage system, it may not be possible to identify phys that are configured as being operable but that are not operable. If a method for comparing configured phys to operable phys is not available, the inoperable of certain configured phys could go unnoticed, thereby degrading the operation of the storage system.

Another technical advantage of the system and method disclosed herein is the ability to identify wide ports and wide port links that are inoperable. Although the comparison of configuration data to a discovered configuration will identify phys or connection points that are inoperable, the inoperability of the phys or connection points may be due to the failure of a wide port in an expander. The system and method disclosed herein provides for the identification of the failure in a wide port or wide port link so that this failure can be corrected. In the absence of the system and method disclosed herein, the failure of a wide port may not be recognized, and the performance of the storage system would be degraded as a result. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a diagram of a data structure that includes a configuration bit map;

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
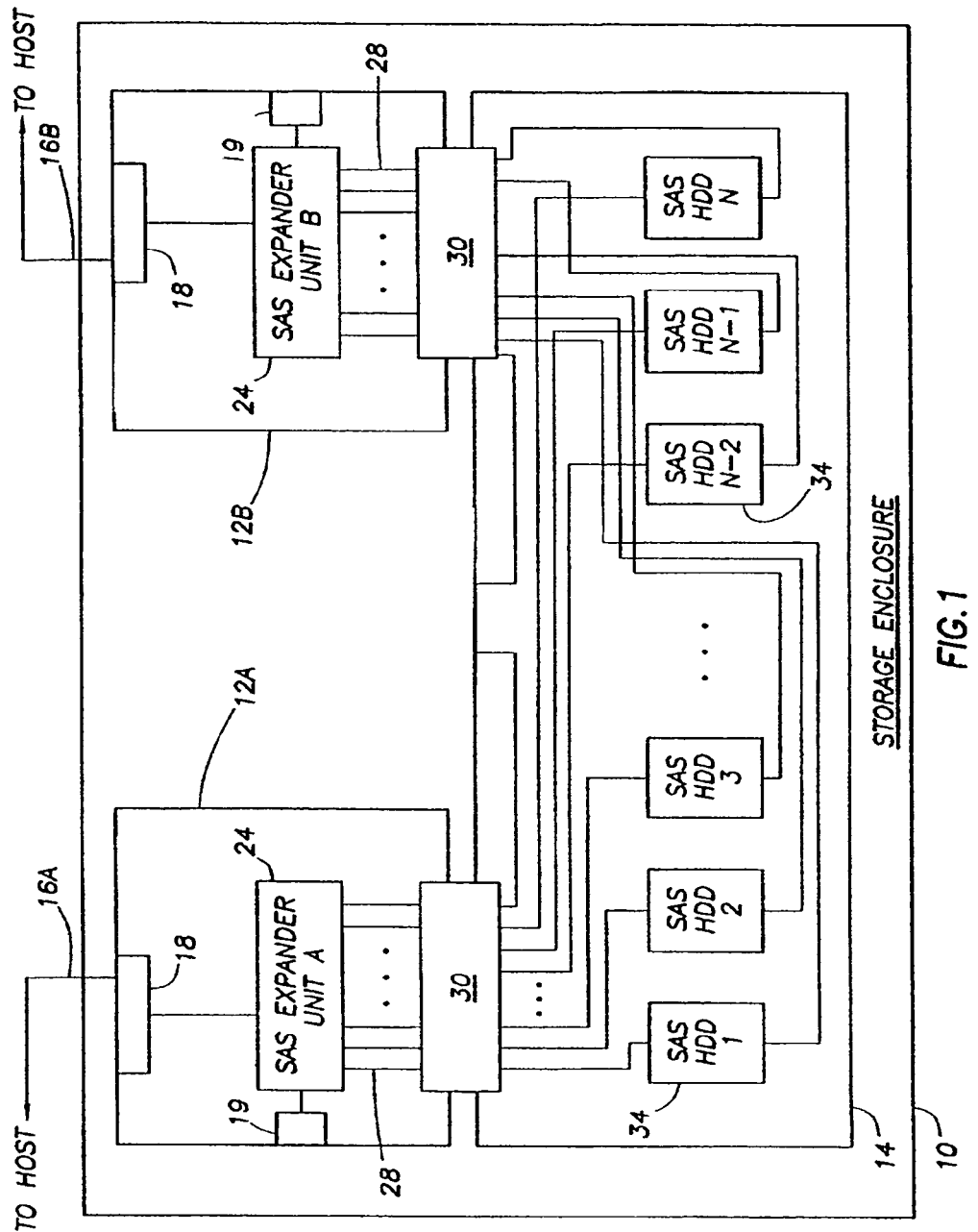
FIG. 1 is a block diagram of a storage enclosure.

The present disclosure relates to a system and method for identifying failed connection points within a storage network. A comparison is made between an expected configuration of connection points and the configuration of connection points that is identified during the initialization of the storage network. Shown in FIG. 1 is a block diagram of a storage enclosure, which is indicated at 10. Storage enclosure 10 includes a pair of storage enclosure controllers 12A and 12B. Storage enclosure controller 12A is coupled to SAS host connection 16A, and storage enclosure controller 12B is coupled to SAS host connection 16B. Each of the SAS host connections 16A and 16B of the storage enclosure controllers 12 is coupled to a SAS host port 18. Each of the SAS host connections 16A and 16B of the storage enclosure controllers 12 is also coupled to a SAS expansion port 19. Each of the controllers 12 also includes a SAS expander unit or expander block 24. The SAS expander blocks of FIG. 1 are identified specifically as SAS expander unit A and SAS expander unit B. The SAS storage drives 34 of the storage enclosures are mounted within a backplane 14. Backplane 14 is coupled to each of the storage enclosure controllers 12 through connector devices 30. Connector device 30 is a high speed connector that serves as an interface between the backplane and the controllers. In the example of FIG. 1, each SAS expander block 24 converts a single 4× wide port communication link from SAS host port 18 into a number of point-to-point SAS connections 28, which are coupled to each of the SAS storage drives 34 through connector devices 30.

Figure 2:
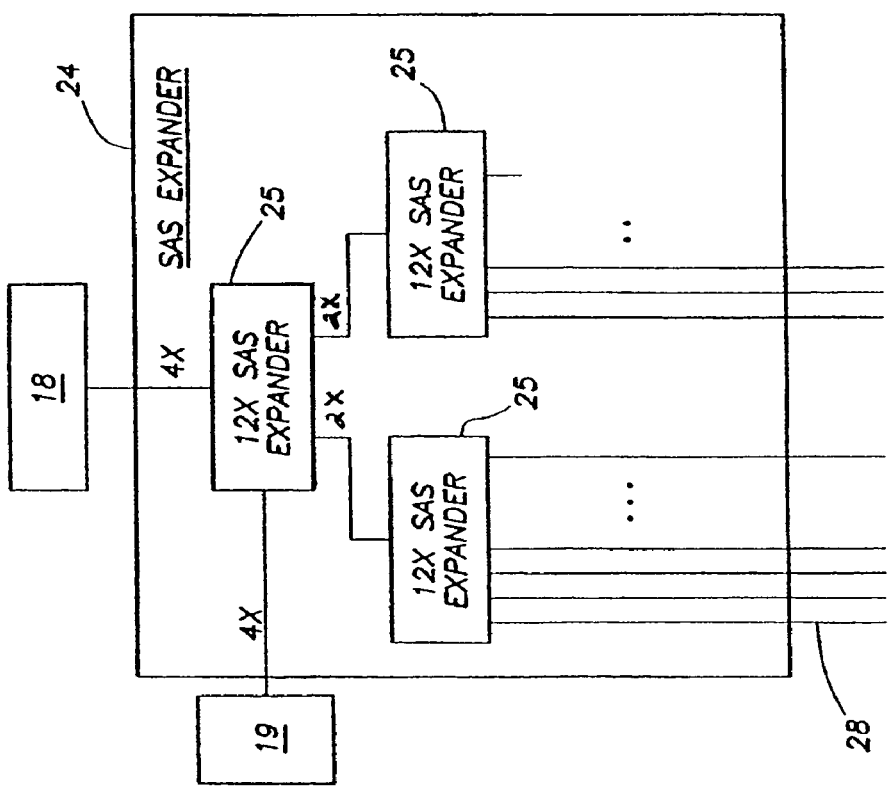
FIG. 2 is a detailed diagram of the expander block of the storage enclosure of FIG. 1.

Shown in FIG. 2 is a detailed diagram of the expander block 24 of FIG. 1. Expander block 24 includes a cascaded series of 12× expanders 25. The cascaded set of expander units 24 convert the 4× input from wide port 18 into a number of point-to-point SAS connections 28. A SAS network operates according to a layered set of communications protocols. Included within the layering of protocols is the Phy layer. A phy is a transmitter-receiver (transceiver) pair within the SAS storage network. In the example of FIGS. 1 and 2, the connection between an expander and an endpoint comprises a transmitter-receiver pair or phy. A phy pair is sometimes referred to as a link, and a wide link contains several phy pairs. A wide port link refers to a link within the wide link.

The disclosed system and method involves encoding in each expander the operational phys or links that are coupled to the expander. The encoding system identifies, for each wide port of the expander, whether each phy of the expander is configured to be operational. This information can be encoded in a suitable data structure within a storage location within or accessible by the expander. One example of a suitable data structure is the data structure that is returned by an expander in response to the SMP REPORT MANUFACTURER INFORMATION command. A first entry or byte in the data structure identifies the number of wide ports that are included in the expander. The next successive entries in the data structure are a series of bit strings. A bit string is associated with each of the wide ports of the expander. Each bit of each bit string is associated with one of the phys of the expander and is associated with the PHY IDENTIFIER, as that term is defined in SAS terminology. Each bit in the bit string identifies whether the phy or connection point associated with the bit is configured to be operational in the wide port. The number of bit strings is equal to the number of wide ports in the expander. The number of bits in each bit string is determined by the number of possible phys or connection points that are contained in the expander.

An example of a suitable data structure 60 is shown in FIG. 3. FIG. 3 is a representation of the encoding of the top level expander 25 of FIG. 2. Encoded in byte 40 of data structure 60 is the number of wide ports in the expander. In this example, four wide ports are coupled to the first of the cascaded expanders 25 of expander block 24. The number of bits allocated to each bit string associated with each wide port depends on the number of phys contained in the expander. In this example, twelve phys are contained in the expander. The number 12 is divided by 8, representing the number of bits in byte, to give a result of 1.5. The result of this operation is rounded to the next highest integer (two), which the result being the number of bytes in each bit string. Because there are four wide ports, there are four bit strings, which are at bytes 41-42, bytes 43-44, bytes 45-46, and bytes 47-48. The combination of the number of wide ports and the bits strings comprise a configuration bit map. The bit string for the first wide port, which represents SAS host port 18, is in bytes 41-42 of data structure 60. The bit string F000h indicates that only the first four phys or connections points are configured to be operational in the first wide port. No other phys are configured to be operational within the first wide port. The bit string for the second wide port, which represents the wide link connecting the top level expander to the right expander of the second level expanders, is in bytes 43-44 of data structure 60. The bit string 0C00h indicates that phys five and six of the twelve phys are configured to be operational on the second wide port. The bit string for the third wide port, which represents the wide link connecting the top level expander to the left expander of the second level expanders, is in bytes 45-46 of data structure 60. The bit string 0300h indicates that phys seven and eight of the twelve phys are configured to be operational on the third wide port of the expander. Finally, the bit string for the fourth wide port, which represents the SAS expansion port 19, is in bytes 47-48 of data structure 60. The bit string 00F0h indicates that phys nine through twelve of the twelve phys are configured to be operational on the fourth wide port of the expander. A logical zero for any bit in any bit string indicates that the phy associated with the bit is not configured as being operational for the wide port or does not exist in the expander device.

Figure 4:
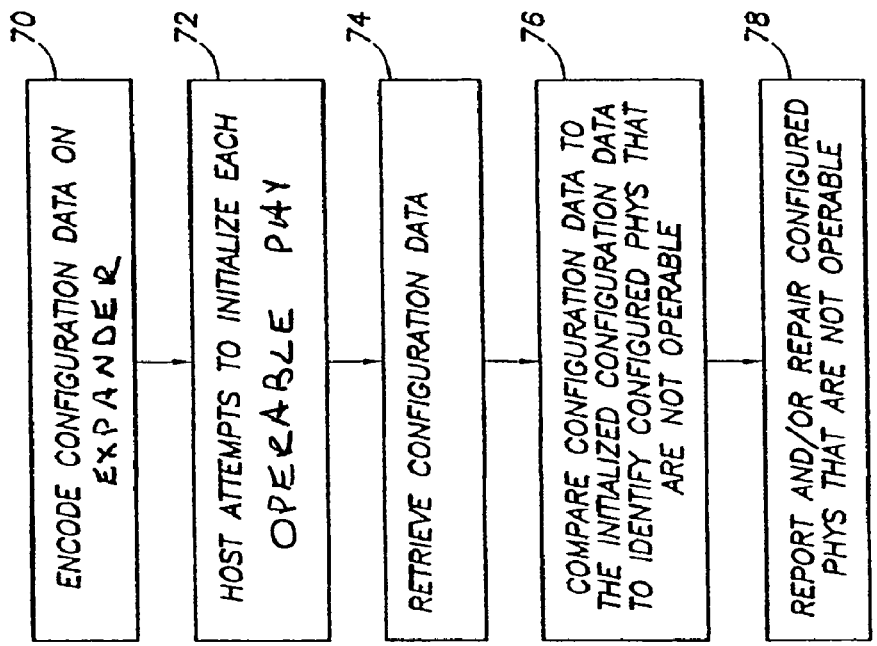
FIG. 4 is a flow diagram of a method for encoding a configuration bit map in an expander and using the configuration bit map to compare the discovered configuration to an expected configuration.

As a result of the encoding of the configuration bit map in each expander 25 of the expander unit 24, the configuration that is discovered as part of the normal discovery process can be compared to the expected configuration that is defined in the configuration bit map. Shown in FIG. 4 is a flow diagram of a series of method steps for encoding a configuration bit map in an expander and using the configuration bit map to compare the discovered configuration to an expected configuration. At step 70, the configuration bit map is encoded in the expander. The bit map is encoded in a location within or associated with the expander and from which the data can be retrieved with a standard SAS command. The configuration bit map could be encoded in an EEPROM within or accessible by the expander at the time the storage controller was manufactured. At step 72, the host attached to the storage controller through SAS host port 18 attempts to discover each phy that is accessible through the expander. The result of the attempt to discover each phy is known as the discovered configuration, which is the configuration of the phys that are coupled to the expander that are operable. At step 74, the configuration data is retrieved from the expander.

At step 76, a comparison is made, for each wide port, between the discovered configuration and the bit strings of the configuration bit map. If there is a match between the discovered configuration and the configuration bit map, then it is known that each phy that should be operable is discovered as being operable and accessible through the configured wide port. If there is a mismatch between the discovered configuration and the configuration bit map, then one or more phys that are configured as being operational and accessible through a wide port of the expander are not operable. Any phys that should be operable but are not operable are reported or repaired at step 78. The inoperability of a phy may be due to the inoperability of an entire wide port. Thus, if a wide port fails, several configured phys will be shown as being inoperable, thereby allowing an identification of the failed wide port.

Figure 5:
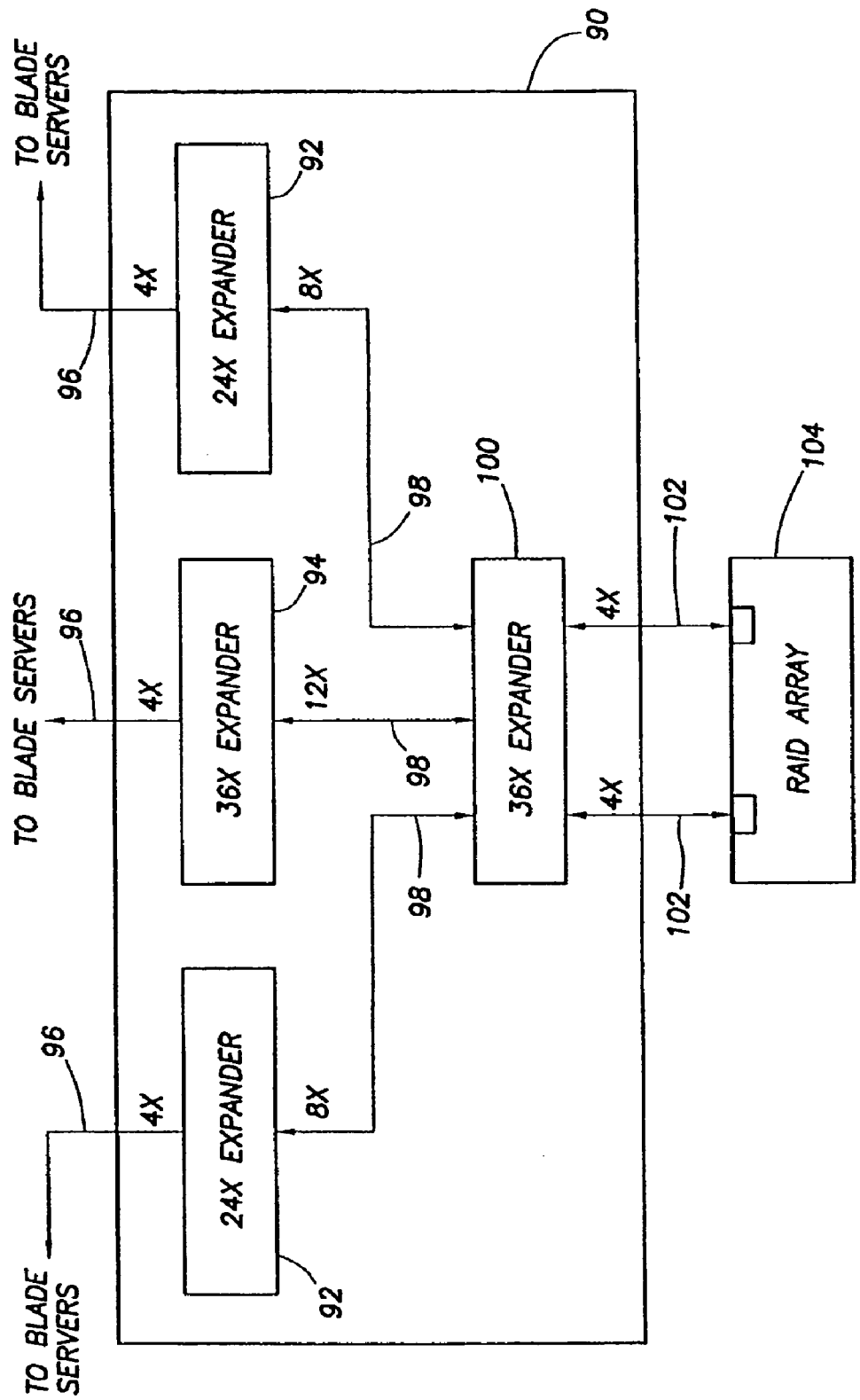
FIG. 5 is a diagram of a storage architecture.

The system and method disclosed herein may be employed with any of the expanders of the expander unit. As such, each expander can be individually considered, taking into account the wide ports of the expander and the phys that are communicatively coupled to the expander. The system and method described herein may also be employed to evaluate the operability of wide ports and phys across an expansion port of a storage enclosure. As such, the system and method disclosed herein can be used to identify operable phys that are communicatively coupled to an expander through an expansion port. The disclosed system and method may be used in any capacity in which a wide port is connected so that it is communicatively coupled to multiple defined end points. As an example, the system and method disclosed herein may be employed in the storage architecture depicted in FIG. 5. Expander block 90 of FIG. 5 includes a number of expanders. Expander block 90 is also known as a blade expander and acts as a communication link between multiple blade servers and a RAID array 104. Expander block includes two 24× expanders 92 and a 36× expander 94. Each of expanders 92 and expander 94 is coupled to a set of blade servers through a 4× wide link 96. Each of expanders 92 and expander 94 is also coupled to a 36× expander 100 through a wide link 98. 24× expanders 92 are coupled to expander 100 through a 8× wide link, and 36× expander 94 is coupled to expander 100 through a 12× wide link. 36× expander 100 is coupled through a pair of 4× wide links to RAID array 104. In this example, a controller in the RAID array, which may be an external RAID controller, may initiate the process steps of FIG. 4 to identify the configured phys as compared to the discovered phys, and the identification and evaluation process will occur with respect to each expander of the expander block.

The system and method disclosed herein provides a technique for comparing a discovered configuration to an expected configuration. The method disclosed herein provides for the identification of inoperable end points as well as the identification of failed wide links within a storage architecture. Although the present disclosure has been described in detail, it should be understood that various changes, substitutions, and alterations can be made hereto without departing from the spirit and the scope of the invention as defined by the appended claims.

What is claimed is:

1. A method for identifying the operability of the connection points of a storage architecture, comprising:
    retrieving from a location in the storage architecture configuration data, wherein the configuration data identifies the configured connection points within the storage architecture, wherein the configuration data comprises a bit string, wherein the respective bits of the bit string correspond to individual connection points in the storage architecture, and wherein the respective bits of the bit string correspond to individual phys within a Serial Attached SCSI expander;
    performing a discovery process to attempt to discover the operability of each connection point within the storage architecture;
    comparing the successfully discovered and operable connection points to the configuration data to identify connection points that are configured as being connection points in the storage architecture but were not discovered as being operable as part of the discovery process; and
    performing at least one of reporting or repairing one or more of the connection points configured as being connection points in the storage architecture but were not discovered as being operable as part of the discovery process.

2. The method for identifying the operability of the connections of a storage architecture of claim 1, wherein the connection points comprise phys within a Serial Attached SCSI storage architecture.

3. The method for identifying the operability of the connections of a storage architecture of claim 1, wherein the bit string comprises multiple bit strings, each of which corresponds to a wide port such that the respective bit string that corresponds to a wide port identifies the phys that are accessible through the wide port.

4. The method for identifying the operability of the connections of a storage architecture of claim 1, further comprising the step of identifying wide ports that include phys that are configured as being operable phys in the wide port but were not discovered as being operable as part of the discovery process.

5. The method for identifying the operability of the connections of a storage architecture of claim 1, wherein the configuration data is encoded within an expander through which the connection points are accessible.

6. The method for identifying the operability of the connections of a storage architecture of claim 5, wherein the configuration data is encoded within a location in a storage enclosure controller of the storage enclosure.

7. A storage system, comprising:
    a wide port;
    a plurality of connection points;
    a plurality of wide port links, each providing a communication link between the wide port and the plurality of connection points; and
    a set of configuration data stored within the storage system, wherein the set of configuration data identifies the connection points that are configured as being operable connection points in the storage system, wherein the configuration data comprises a bit string, wherein the respective bits of the bit string correspond to individual connection points in the storage system, and wherein the respective bits of the bit string correspond to individual phys within a Serial Attached SCSI expander; and
    a host coupled to the storage system, wherein the host is operable to perform at least one of reporting or repairing one or more of the connection points configured as being connection points in the storage architecture but were not discovered as being operable as part of the discovery process.

8. The storage system of claim 7, wherein the connection points comprise phys within a Serial Attached SCSI storage architecture.

9. The storage system of claim 7, wherein the bit string comprises multiple bit strings, each of which corresponds to a wide port such that the respective bit string that corresponds to a wide port identifies the phys that are accessible through the wide port.

10. The storage system of claim 7, wherein the connection points are accessible through a storage enclosure.

11. The storage system of claim 10, wherein the configuration data is stored in an expander through which the connection points are accessible.

12. A method for verifying the operable status of end points in a storage system, wherein the storage system includes an expanders that includes a number of wide ports, comprising:
    retrieving an encoded configuration from a location in the storage system, wherein the encoded configuration identifies end points configured in the storage system as being operable, wherein the encoded configuration comprises a bit string, wherein the respective bits of the bit string correspond to individual connection points in the storage system, and wherein the respective bits of the bit string correspond to individual phys within a Serial Attached SCSI expander;
    attempting to discover the operability of each end point in the storage system, wherein the result of the attempt to discover the operability of each end point in the storage system is a discovered configuration of operable end points;
    comparing the discovered configuration to the encoded configuration to identify end points that are not operable but are configured as being operable;
    for any end points that are not operable but are configured as being operable, identify the wide port that is configured to include the end points; and
    performing at least one of reporting or repairing at least one of the end points that are not operable but are configured as being operable.

13. The method for verifying the operable status of end points in a storage system of claim 12, wherein the end points comprise phys within a Serial Attached SCSI storage system.

14. The method for verifying the operable status of end points in a storage system of claim 12, wherein the bit string comprises multiple bit strings, each of which corresponds to a wide port of the expander such that the respective bit string that corresponds to a wide port identifies the phys that are accessible through the wide port of the expander.

15. The method for verifying the operable status of end points in a storage system of claim 14, wherein the end points are accessible through a storage enclosure.

\* \* \* \* \*